United States Patent [19]

Shima

[11] Patent Number: 4,791,562
[45] Date of Patent: Dec. 13, 1988

[54] DATA PROCESSING SYSTEM IN WHICH MODULES LOGICALLY "OR" NUMBER SEQUENCES ONTO CONTROL LINES TO OBTAIN THE USE OF A TIME SHARED BUS

[75] Inventor: George T. Shima, Tokyo, Japan
[73] Assignee: Unisys Corporation, Detroit, Mich.
[21] Appl. No.: 804,347
[22] Filed: Dec. 2, 1985
[51] Int. Cl.[4] .................. G06F 9/46; G06F 7/02
[52] U.S. Cl. ............................................. 364/200
[58] Field of Search ... 364/200 MS File, 900 MS File; 340/825.5; 370/85, 89, 94

[56] References Cited

U.S. PATENT DOCUMENTS

| | | | |
|---|---|---|---|
| 3,983,540 | 9/1976 | Keller et al. | 364/200 |
| 4,096,355 | 6/1978 | Rothauser | 370/93 |
| 4,229,792 | 10/1980 | Jensen et al. | 364/200 |
| 4,271,465 | 6/1981 | Ohtsuka et al. | 364/200 |
| 4,281,380 | 7/1981 | De Mesa, III et al. | 364/200 |
| 4,320,452 | 3/1982 | Kempf et al. | 364/200 |
| 4,320,457 | 3/1982 | Tanikawa | 364/200 |
| 4,320,467 | 3/1982 | Glass | 340/825.5 |
| 4,320,502 | 3/1982 | de Veer | 370/85 |
| 4,323,967 | 4/1982 | Peters et al. | 364/200 |
| 4,334,288 | 6/1982 | Booher | 364/900 |
| 4,402,040 | 8/1983 | Evett | 364/200 |
| 4,451,881 | 5/1984 | Grice et al. | 370/85 |
| 4,468,738 | 8/1984 | Hansen et al. | 364/200 |
| 4,470,112 | 9/1984 | Dimmick | 364/200 |
| 4,473,880 | 9/1984 | Budde et al. | 364/200 |
| 4,516,205 | 5/1985 | Einga et al. | 364/200 |
| 4,626,843 | 12/1986 | Szeto et al. | 340/825.5 |

*Primary Examiner*—Archie E. Williams, Jr.
*Assistant Examiner*—Danh Phung
*Attorney, Agent, or Firm*—Charles J. Fassbender; L. Joseph Marhoefer

[57] ABSTRACT

A data processing system includes a plurality of data processing modules coupled to a bus and to a set of control lines. These modules request the use of the bus by sending respective sequences of at least two binary numbers during successive cycles on the control lines in synchronization with each other. On the control lines the numbers are logically ORed together. Each module terminates the sending of its numbers if, during any one of the successive cycles, the logical OR is greater than twice the number which the module itself is sending. A module uses the bus only if, during each of the successive cycles, the logical OR does not exceed the number which the module itself sends.

6 Claims, 4 Drawing Sheets

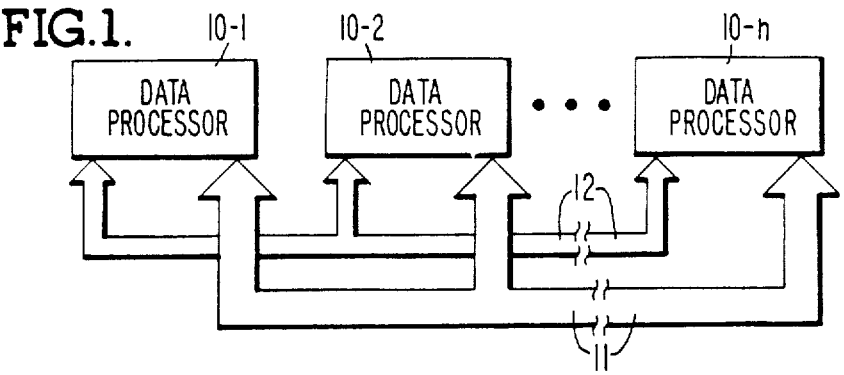

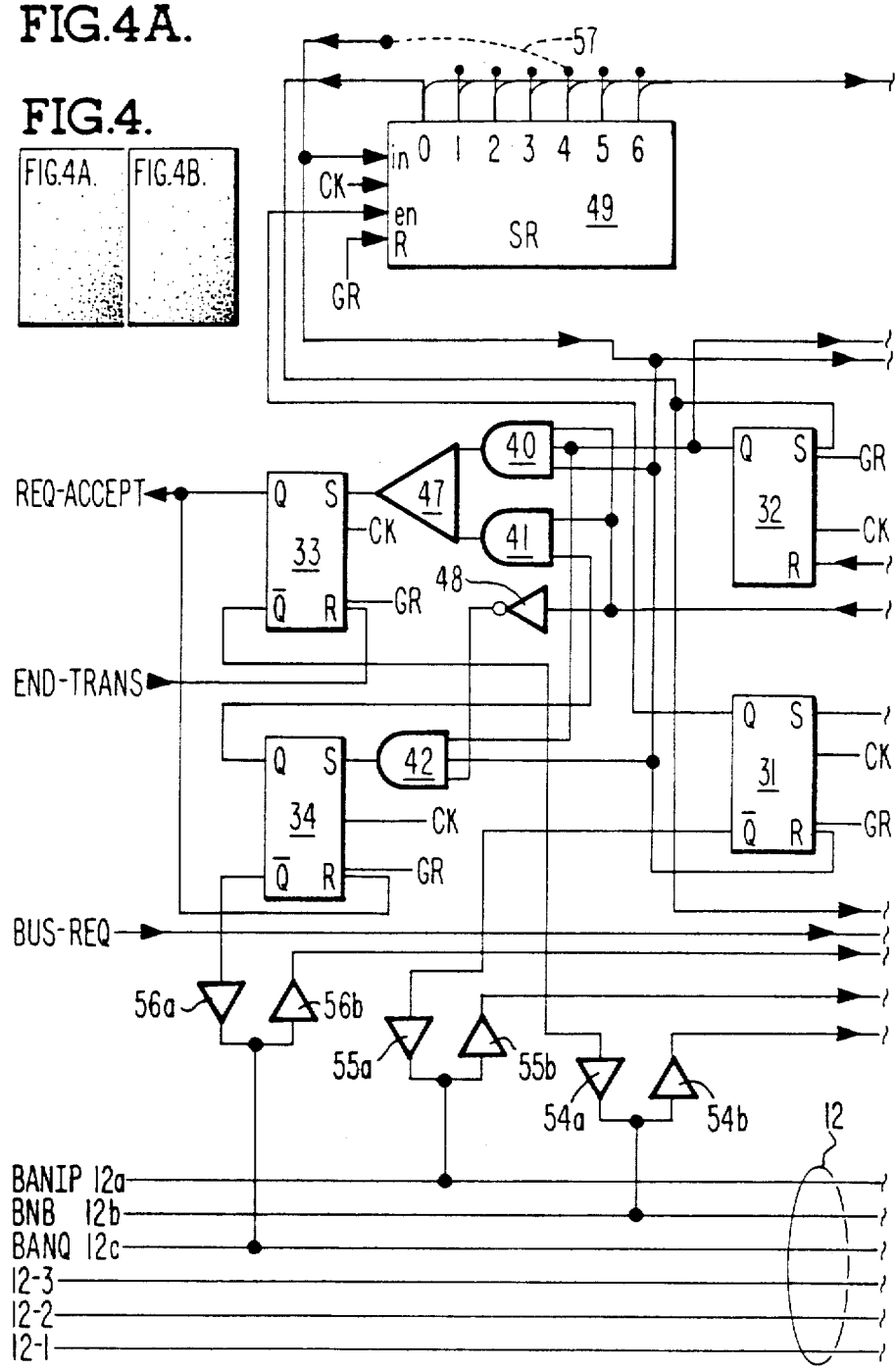

006
DATA PROCESSING SYSTEM IN WHICH MODULES LOGICALLY "OR" NUMBER SEQUENCES ONTO CONTROL LINES TO OBTAIN THE USE OF A TIME SHARED BUS

BACKGROUND OF THE INVENTION

This invention relates to data processing systems of the type in which a plurality of data processing modules send messages to each other over a time shared data bus; and in particular, it relates to circuits that are incorporated into the modules which obtain the use of the bus.

When a data bus is time shared by several modules, some means must be provided to determine which of the modules can use the bus at any particular time. One common way of achieving this in the prior art was to provide a separate control line for each module that could use the bus. For example, if sixteen modules used the bus, then sixteen control lines would be provided. If a module wanted to use the bus, it would generate a signal on its control line. Each such signal was assigned a priority; and the module which generated the highest priority signal was granted the use of the bus.

However, a serious drawback of this type system is that it is impractical to use with a large number of modules since the number of control lines becomes too burdensome. For example, if a bus is to be time shared by two hundred fifty-six modules, then two hundred fifty-six control lines are required. Typically, the data bus itself has only eight, sixteen, or thirty-two data lines; and so two hundred fifty-six control lines would far exceed the number of data lines.

Another type of prior art system overcomes the above problem by intercoupling the modules in a daisy-chained arrangement. In this arrangement, one control line intercouples a transmitter in the first module to a receiver in the second module; another control line intercouples a transmitter in the second module to a receiver in the third module; etc. If the first module wants to use the bus, then it generates a bus request signal on its transmitter. That signal passes through all the remaining modules which then respond by inhibiting their own bus requests. If the first module does not request the use of the bus, then the second module can generate the bus request signal from its transmitter. This signal is received and recognized by the remaining modules and they in turn inhibit making their own requests. Thus, in this daisy-chained system, each module may request the use of the bus only if it does not receive a request to use the bus from another module.

However, a problem with this system is that the priority of each device is inherently fixed. That priority is determined solely by the module's position in the daisy chain. This limitation severely limits the modules which are near the end of the daisy chain since they have no way of sending messages with a high priority. Such messages are desirable, for example, when a module's data buffer is filling up and approaching an overflow condition, when a module's data buffer is emptying and approaching an underflow condition, or when an emergency situation of any type arises which needs immediate attention.

Accordingly, a primary object of the present invention is to provide an improved data processing system in which the above described problems are overcome.

BRIEF SUMMARY OF THE INVENTION

In accordance with the present invention, the above object and others are achieved by a data processing system which includes a plurality of data processing modules that are coupled to a time shared bus and to a set of control lines; wherein each module has (1) a circuit that requests the use of the bus by sending a sequence of at least two binary numbers during successive cycles on the control lines in synchronization with any other modules which also request the use of the bus; (2) transmitters for logically ORing the numbers as sent by itself and the other modules; (3) a circuit for terminating the sending of its numbers if during any one of the successive cycles the logical OR is greater than twice the number which the module itself is sending; and (4) a circuit for signaling that it may send a message on the bus when during each of the successive cycles the logical OR does not exceed the number which the module itself sends.

BRIEF DESCRIPTION OF THE DRAWINGS

Various features and advantages of the invention are described in the Detailed Description in conjunction with the accompanying drawings wherein:

FIG. 1 is a block diagram of a data processing system that is constructed according to the invention;

FIG. 2 shows one example of how several modules in the FIG. 1 system transmit and logically OR number sequences onto control lines to obtain the use of a bus;

FIG. 3 shows how the total number of FIG. 1 modules which can use the bus increases as a function of the number of control lines and the length of the number sequence;

FIG. 4, includes FIGS. 4A and 4B, is a detailed logic diagram of a circuit which sends number sequences in the fashion described in FIG. 2.

DETAILED DESCRIPTION OF THE INVENTION

Figure 4B:
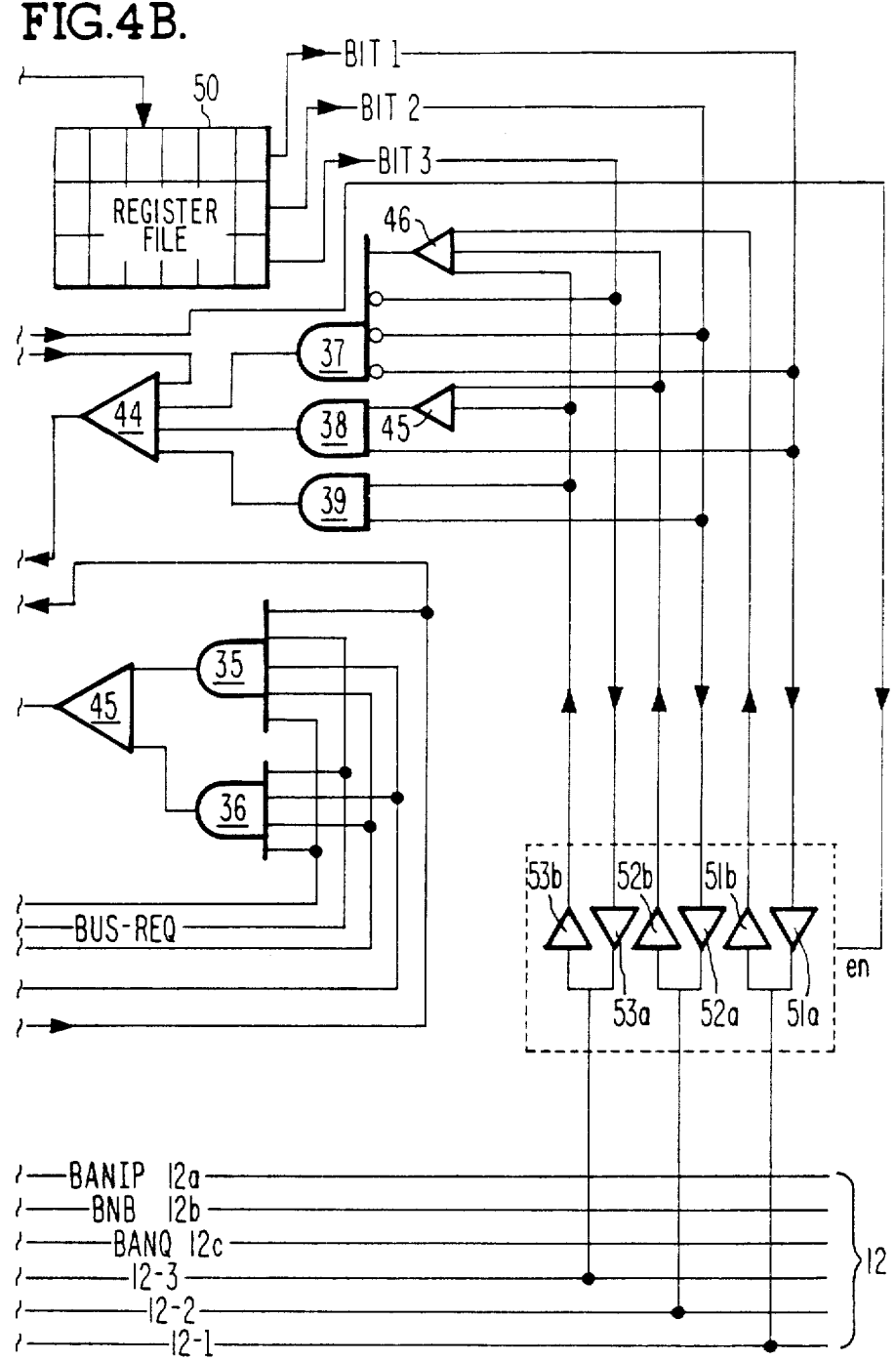

Referring now to FIG. 1, the details of a data processing system which is constructed in accordance with the invention will be described. This system includes a plurality of data processing modules 10-1 thru 10-n. Each of these modules may be any type of digital data processing unit such as, for example, a digital computer or a controller for a memory, a tape, a disc, a printer, a data set, a telephone, etc.

All of the modules 10-1 thru 10-n are intercoupled to each other via a bus 11. This bus is utilized to send messages and data from one module to another in a time shared fashion. A set of control lines 12 also intercouples the modules, and it enables the modules to signal each other and thereby determine which module has the use of bus 11 at any one time. Details of how the modules signal each other over the control lines 12 are illustrated in FIG. 2.

All of the modules which desire to use bus 11 send a respective sequence of three binary numbers during successive cycles on the control lines 12 in synchronization with each other. During each cycle, the numbers that are sent are logically ORed on the control lines 12. If, during any one of the cycles, the logical OR on the control lines 12 is greater than twice the number which a module is sending, then that module stops sending the remaining numbers of its sequence. A module gains access to bus 11 if, during each of the successive cycles, the logical OR on the control lines 12 doe not exceed twice the number which the module itself is sending.

In FIG. 2, a total of four modules, (A, B, C, and D) seek to use bus 11 as an example. Also as an example, these modules are assigned the following number sequences:

Module A is assigned 010-100-001
Module B is assigned 001-010-100
Module C is assigned 010-100-010
Module D is assigned 010-001-000

During the first cycle (CY1 in FIG. 2), modules A thru D logically OR the first (leftmost) number of their number sequence onto the control lines 12. This produces a binary three as indicated by reference numeral 21. Since a binary three is larger than twice the binary one which module B sent onto the control lines, module B during the following cycles does not send the remaining numbers of its number sequence.

During the second cycle (CY2), modules A, C, and D send the second (middle) number of their sequence onto the control lines 12. A circle around the middle number for module B in FIG. 2 indicates that module B does not send that number during CY2. Reference numeral 22 indicates that the result of the logical OR of the numbers from modules A, C, and D during CY2 is a binary five. This five is more than twice the binary one which module C is sending, and so module D does not send any more numbers on the control lines.

During the third cycle (CY3), only modules A and C send the third (rightmost) number of their sequence onto the control lines. Modules B and D do not send any numbers during the third cycle as indicated by the circles in FIG. 2 under the CY3 column. This produces a logical OR of a binary three as indicated by reference numeral 23. Since a binary three is greater than twice the binary one from module A but is not greater than twice the binary two from module C, module C acquires the use of bus 11.

As is stated above, FIG. 2 illustrates just one example of the number of sequences that may be assigned modules A thru D. In general, each number of a sequence for a module is restricted to contain no more than a single "1" bit; however, the entire sequence of numbers for a module can contain multiple "1" bits. Thus, each number in the sequences for each module of FIG. 2 is selected from the set of 000 or 001 or 010 or 100.

Also, the number of control lines 12 on which the number sequences are sent is not restricted to three as illustrated in FIG. 2, but instead there can be any desired number of control lines such as two, three, or four. Further, the length of a number sequence is not limited to three numbers as illustrated in FIG. 2, but it can be any number such as two, three, four, or five. FIG. 3 shows that a small increase in the number of control lines 12 or small increase in the length of a number sequence produces a very large increase in the maximum number of modules that can time share bus 11.

When there are three control lines and three numbers per sequence, a total of sixty-four modules may time share bus 11. However, when there are three control lines and four numbers per sequence, a total of two hundred fifty-six modules may time share bus 11; and when there are three control lines and five numbers per sequence, a total of one thousand twenty-four modules may time share bus 11.

Thus, a primary advantage of the present invention is that it enables a large number of modules to time share a bus, while at the same time, only a small number of control lines are needed to obtain access to the bus and a module's priority for gaining access to the bus is not determined by its position on the bus. In mathematical terms, the total number of modules which can time share bus 11 equals $(C+1)^S$ where C is the number of control lines and S is the number of cycles per sequence.

Turning now to FIG. 4, the details of a logic circuit will be described which may be utilized in each of the modules 10-1 thru 10-n to send the number sequences on the control lines 12. This circuit includes flip-flops 31, 32, 33, and 34; AND gates 35, 36, 37, 38, 39, 40, 41, and 42; OR gates 43, 44, 45, 46, and 47; an inverter 48; a shift register 49; a register file 50; and transmitter receiver pairs 51a-51b, 52a-52b, 53a-53b, 54a-54b, 55a-55b, and 56a-56b. All of these components are interconnected as illustrated in FIG. 4. However, as will be explained in detail below, components 34, 36, 41, 42, 48, and 56a-56b are included to provide an optional feature, and they may be eliminated if that option is not desired.

Figure 5:
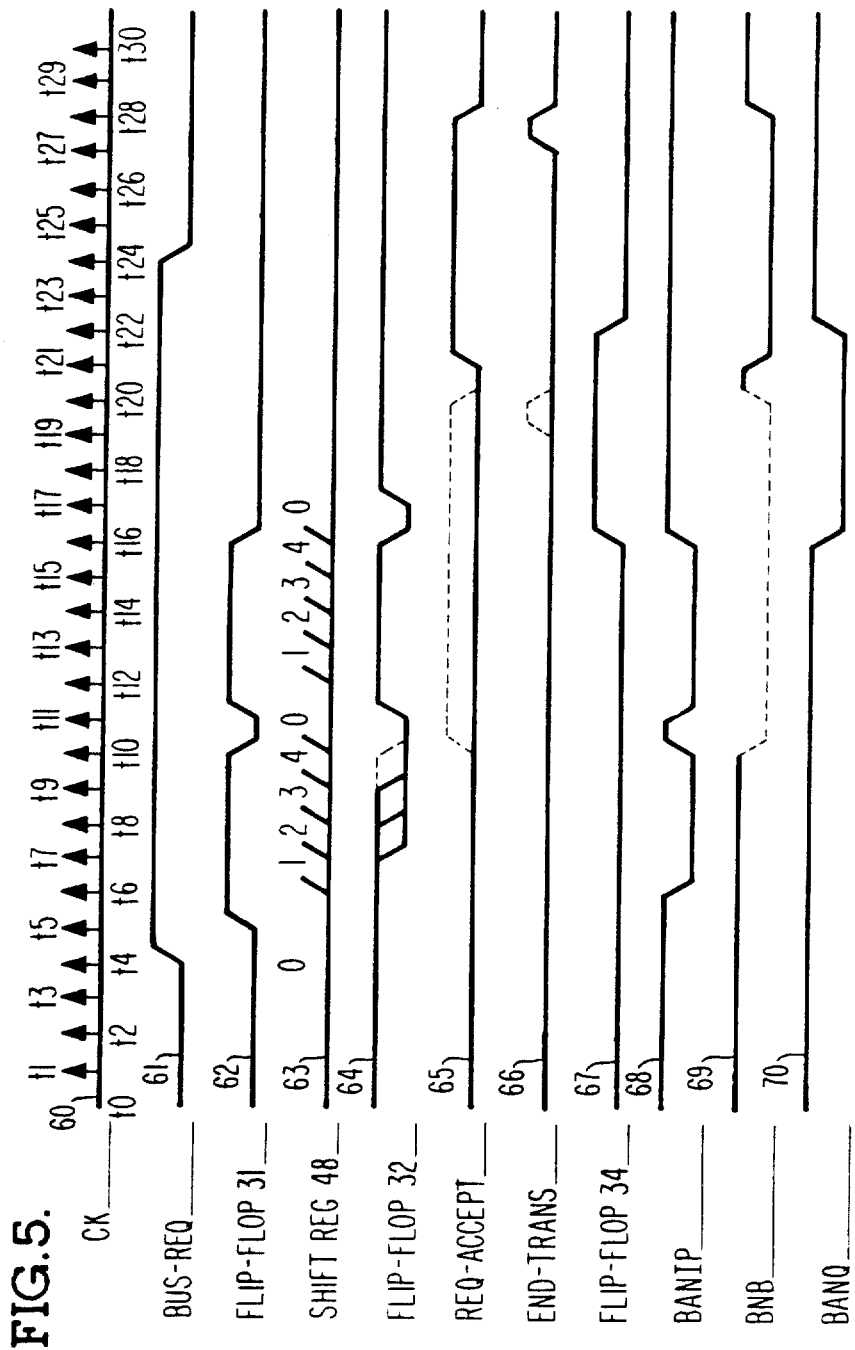
FIG. 5 is a timing diagram which illustrates the operation of the FIG. 4 circuit.

To help explain the operation and use of the FIG. 4 circuit, a timing diagram of FIG. 5 is provided. This diagram illustrates various logic signals as they occur in the FIG. 4 circuit when it is operating to transmit a sequence of binary numbers on the control lines 12. Prior to the start of this operation, the logic circuit is initialized by a general reset signal (GR) which resets flip-flops 31, 33, and 34; sets flip-flop 32; and places shift register 49 in a zero state. In FIG. 5 this occurs before time $t_1$. Also, before time $t_1$, the number sequence which the FIG. 4 circuit is to transmit is electrically stored in the register file 50.

Once the FIG. 4 circuit is initialized, its state remains unchanged until a "bus request" signal (BUS-REQ) is received from the module in which the circuit is incorporated. This is illustrated in FIG. 5 as occurring in sync with time $t_5$. Signal BUS-REQ passes through AND gate 35 and OR gate 43 to the set input terminal of flip-flop 31. Thus, flip-flop 31 is triggered to a set state by the clock (CK) at time $t_5$.

Flip-flop 31 has its Q-NOT output terminal coupled through transmitter 55a to one of the control lines 12a. This line carries a "bus assignment not in progress" signal (BANIP). Flip-flop 31 being set forces BANIP to a "0" which indicates that the FIG. 4 circuit is in the process of transmitting a number sequence to obtain the use of bus 11. Due to AND gate 35, no module will initiate the transmitting of its number sequence unless signal BANIP is a "1". Accordingly, the FIG. 4 logic circuit operates to synchronize sending the number sequences from all the modules.

Flip-flop 31 also has its Q output terminal coupled to an enable input of shift register 49. That coupling causes the shift register to cycle through its states when flip-flop 31 is set. Thus, at time $t_6$ in FIG. 5, shift register 49 changes from state zero to state one; at time $t_7$ it changes from state one to state two; etc.

A selective connection 57 is provided from shift register 49 which determines the last state of the shift register (i.e., the state after which register 49 will return to state zero). Connection 57 is chosen such that the signal state which it carries equals one plus the length of the number sequence which the FIG. 4 circuit transmits on the control lines 12. For example, if there are three numbers per sequence, then connection 57 is coupled to carry signal state four (one plus three).

During state one of register 49, the FIG. 4 circuit transmits the first number of its sequence on the control lines 12. This number is addressed and read by shift register 49 from the register file 50, and it passes through the transmitters 51a, 52a, and 53a. Bit 1, (the least significant bit) is ORed from transmitter 51a onto control line 12-1; bit 2 is ORed from transmitter 52a onto control line 12-2; and bit 3 is ORed from transmitter 53b onto control lines 12-3. Other modules transmit their numbers in a similar fashion.

These logical OR signals pass through receivers 51b, 52b, and 53b to gates 37, 38, 39, 45, and 46. If the logical OR on the control lines 12 is greater than twice the number which the module itself is sending, these gates produce a "1" on the reset terminal of flip-flop 32. Thus, flip-flop 32 resets at the end of state one of register 49 if the logical OR of the first numbers on the control lines 12 is greater than twice the first number which the FIG. 4 circuit sends. This is shown in FIG. 5 as occurring at time $t_5$. Gates 37 and 46 cover the case where the FIG. 4 circuit transmits a binary zero; gates 38 and 45 cover the case where the FIG. 4 circuit transmits a binary one; and gate 45 covers the case where the FIG. 4 circuit transmits a binary two.

Similarly, during state two of shift register 49, the FIG. 5 circuit reads the second number of its sequence from file 50 and OR's it onto the control lines 12. Flip-flop 32 resets at the end of state two if the logical OR on the control lines 12 during state two is greater than twice the second number which the FIG. 4 circuit sends. This is shown in FIG. 5 as occurring at time $t_6$. All remaining numbers in the sequence are operated in a similar fashion.

When the last state of shift register 49 is reached, flip-flop 32 is examined to see if it is still set. In FIG. 5, this occurs at time $t_{10}$. If flip-flop 32 is set, then AND gate 40 and OR gate 47 generate a "1" on the set input terminal of flip-flop 33; and so flip-flop 33 sets at time $t_{10}$. This causes the "request accepted" signal (REQ-ACC) to be a "1", and in response, the module in which that occurs can start transmitting messages on bus 11.

However, flip-flop 32 will be set during the last state of shift register 49 in only one of the modules which sends its number sequence to the control lines 12. In all of the other modules, flip-flop 32 will be reset by the time shift register 49 reaches its last state. Thus in those modules, the "request accepted" flip-flop 33 will remain reset due to the operation of AND gate 40.

Also, when the last logic state of shift register 49 is reached, the reset input terminals of flip-flops 31 and 32 are enabled. Consequently, those flip-flops are reset at the end of the last logic state of shift register 49. This is indicted as occurring in FIG. 5 at time $t_{10}$. At that time, the FIG. 4 circuit in all the modules except one is returned to its initial state; and in that one module, only flip-flop 33 is set. Dashed lines in FIG. 5 indicate the signals which are generated by the module which obtains bus 11 at time $t_{10}$.

Flip-flop 33 has its Q-NOT input terminal coupled through transmitter 54a to a control line 12b which carries a "bus not busy" signal (BNB). That signal is coupled through receiver 54b to AND gate 35. Thus, AND gate 35 is disabled from initiating the sending of further number sequences onto the control lines 12 until flip-flop 33 in the module which acquired the use of the bus becomes reset. This reset occurs in response to an "end transmission" signal (END-TRANS) which is generated by the module when it has finished using bus 11. In FIG. 5 this is indicated as occurring at time $t_{20}$.

If the optional circuit components are not included in the FIG. 4 circuit, then no further number sequences will be transmitted on the control lines 12 until the BNB signal returns to a "1". However, by including the optional components, the FIG. 4 circuit sends a number sequence on the control lines 12 while the bus 11 is busy. This enables the next user of the bus to be determined while messages are being sent on the bus by its current user.

Beginning at time $t_{11}$, FIG. 5 shows how these optional components operate. At that time, all of the logic signals to AND gate 36 are a logical "1" in those modules which requested the use of the bus but did not obtain it. Thus, in those modules, AND gate 36 will cause flip-flop 31 to set at time $t_{11}$. In response to flip-flop 31 being set, shift register 49 will cycle through all of its states; and the FIG. 4 circuit will operate as previously described to OR a number sequence onto the control lines 12 and examine the results. This is illustrated as occurring in FIG. 5 from time $t_{12}$ to time $t_{15}$.

When shift register 49 reaches its last state, flip-flop 32 will be set in only one of the modules which placed its number sequence on the control lines 12. At that time, AND gate 42 operates to examine whether or not flip-flop 32 is still set. If flip-flop 32 is still set then flip-flop 34 will set; otherwise flip-flop 34 will stay reset. This is illustrated in FIG. 5 as occurring at time $t_{16}$.

Flip-flop 34 has its Q-NOT output terminal coupled through transmitter 56a to control line 12c which carries a "bus assignment not queued" signal (BANQ). That signal is coupled through receiver 56b to the input of AND gates 35 and 36. Thus, whenever flip-flop 34 is set in any module, AND gates 35 and 36 are inhibited from initiating the ORing of any further number sequences onto the control lines 12.

Flip-flop 34 remains set until the current user of bus 11 ends its message transmissions and resets its flip-flop 33. When that occurs, the Q-NOT output signal of flip-flop 33 passes through transmitter 54b onto control line 12b to force signal BNB to a "1". Signal BNB then passes through receiver 54b to AND gate 41 of the module which has its flip-flop 34 set. That enables the Q output signal of flip-flop 34 to pass through AND gate 41 and set flip-flop 33. In FIG. 5 this is illustrated as occurring at time $t_{21}$.

Flip flop 33 has its Q output signal coupled to the reset input terminal of flip-flop 34. Thus, when flip-flop 33 sets, flip-flop 34 resets on the next clock signal. This is illustrated in FIG. 5 as occurring at time $t_{22}$. Once flip-flop 34 is reset, the BANQ signal is forced to a "1"; and this enables AND gate 36 in all the modules to initiate the sending of another number sequence on the control lines 12.

A preferred embodiment of the invention has now been described in detail. In addition, however, many changes can be made to these details without departing from the nature and spirit of the invention. Accordingly, the invention is not to be limited to these details but is to be defined by the appended claims.

What is claimed is:

1. A data processing system including:
   a plurality of data processing modules coupled to a bus and to control lines;
   each module having a requesting means, coupled to said control lines, for requesting the use of said bus by sending a sequence of N binary numbers on said control lines during N successive cycles, each requesting means including a synchronizing means for synchronizing the sending of said numbers such that the ith number from all modules are sent in the ith cycle at the same time, where i is one thru N;

each module including an ORing means, coupled to said control lines, for logically ORing said ith numbers of each sequence as sent by itself and the other modules;

each module having a terminating means, which couples said ORing means to said requesting means, for terminating the sending of its sequence of N numbers if, during any one of said successive cycles, said logical OR of the numbers on the control lines is greater than twice the number which the module itself is sending; and each module having a signaling means, coupled to said requesting means and said terminating means, for signaling it to send a message on said bus if said logical OR of the numbers on the control lines for each of said N cycles taken separately does not exceed the number which the module itself sends; wherein, each of said N binary numbers that are sent in said N successive cycles is a multibit number, and N is an integer from two to five which is predetermined before said modules request the use of said bus.

2. A data processing system according to claim 1 wherein each number which said modules send contains no more than a single "1" bit.

3. A data processing system according to claim 2 wherein the total number of modules in said plurality of data processing modules exceeds the total number of said control lines.

4. A data processing system according to claim 3 wherein said means for requesting in said modules includes a means for electrically changing the numbers which the respective modules send.

5. A data processing system according to claim 3 wherein said means for requesting in said modules includes a means for electrically changing the total number of successive cycles in said sequence.

6. A data processing system according to claim 3 wherein said means for requesting in said modules includes a means for initiating the sending of said sequence of numbers on said control lines at the same time that messages are transmitted on said bus.

* * * * *